Jan. 3, 1928.
B. VALE
1,654,766
SPOTLIGHT ASSEMBLY
Filed June 3, 1922
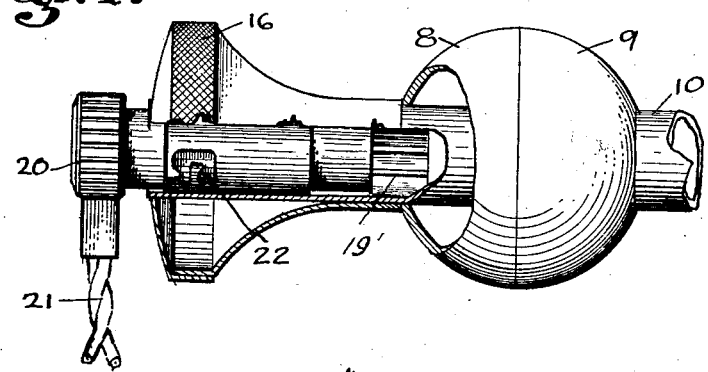
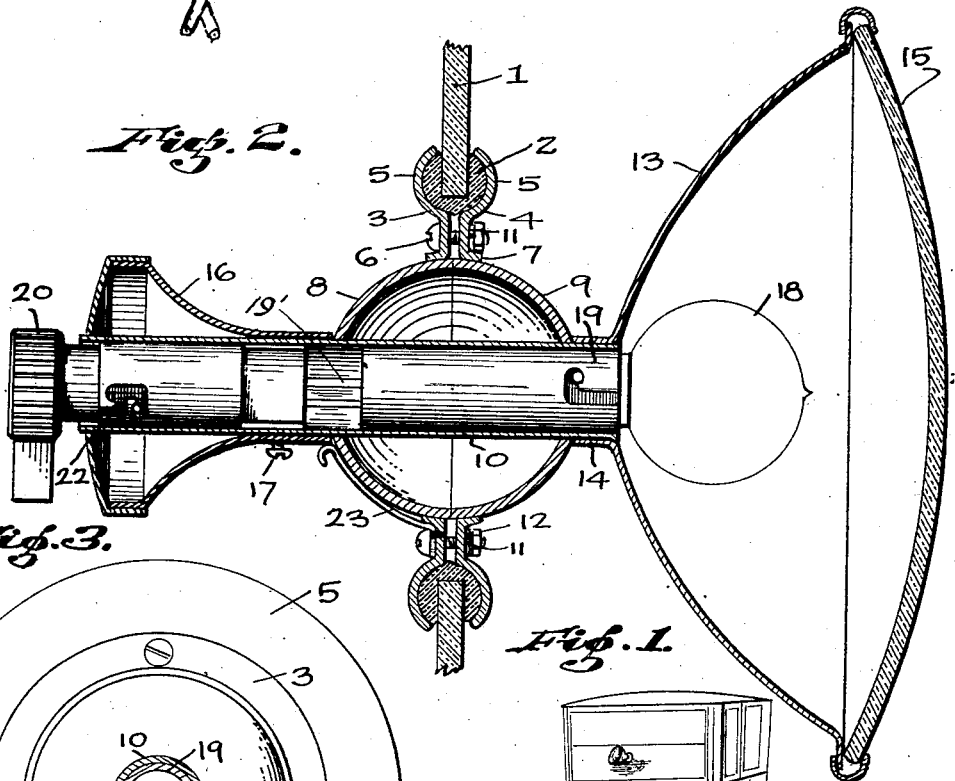
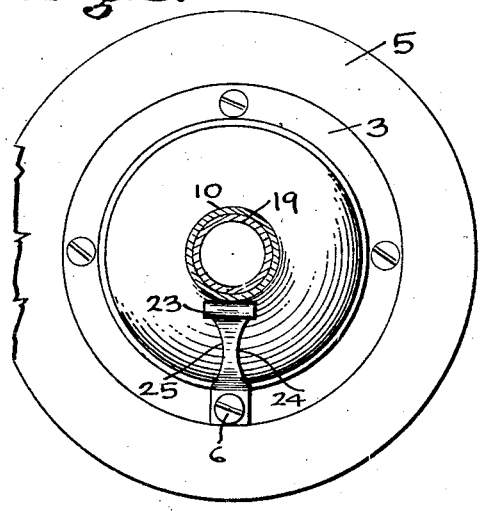
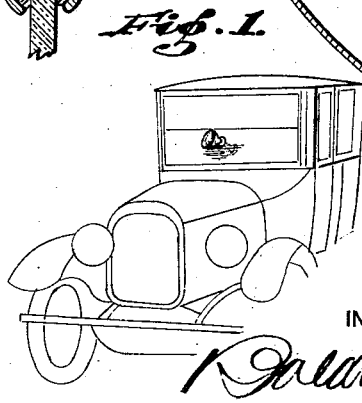
INVENTOR Patented Jan. 3, 1928.

1,654,766

UNITED STATES PATENT OFFICE.

BALDWIN VALE, OF SEATTLE, WASHINGTON, ASSIGNOR, BY MESNE ASSIGNMENTS, TO THE CLYMER MANUFACTURING COMPANY, OF DENVER, COLORADO, A CORPORATION OF COLORADO.

SPOTLIGHT ASSEMBLY.

Application filed June 3, 1922. Serial No. 565,787.

Among the objects of this invention is to provide means for mounting and operating spotlights and other instruments through a pane of glass or other partition, whereby the spotlight may be adjusted at any desired angle.

A further object of the invention is to provide means, whereby the horizontal control of the spotlight may be circumscribed, to keep its operation within the legal limits prescribed in various communities. Other objects and advantages will appear as this description progresses.

It has been the practice heretofore to mount spotlights in brackets attached to the frame of the glass windshield of automobiles, motor boats and the like, so that the beams of said spotlights may be directed at the will of the operator. A disadvantage of this location is that the operator must reach outward from the vehicle to operate the light, subjecting his hand and arm to the inclemencies of the weather. On limousines and other types of closed cars, the windshield presents no suitable location for the spotlight, nor means for operating the same from the interior of the car.

The present invention makes it possible to mount the spotlight through the glass of the windshield with the operating handle within the car.

In this specification, and the annexed drawings, the invention is illustrated in the form considered to be the best, but it is to be understood that the invention is not limited to such form, because it may be embodied in other forms, and it is is also to be understood that in and by the claims following the description, it is desired to cover the invention in whatsoever form it may be embodied. This application has been filed in place of applicant's abandoned application Serial No. 358,920, filed February 16, 1920.

In the accompanying one sheet of drawings:

Fig. 1 is a perspective view illustrating the application of this invention to the windshield of an automobile.

Fig. 2 is a vertical section in enlarged detail through the spotlight mechanism and the windshield.

Fig. 3 is a detail illustrating the means for limiting the movement of the light.

Fig. 4 is a side elevation, partly in perspective, of a fragmentary portion of Fig. 2.

In detail, the construction illustrated in the drawings comprises the windshield 1, that is usually of heavy plate glass approximating one quarter of an inch in thickness. A hole is made through the glass at the desired location by scoring a circle on the surface of the same with a diamond point, cross scoring the glass within the circle, and knocking out the center of the circle in the usual manner forming a hole, preferably about three inches in diameter.

A piece of rubber tubing, in length equal to the circumference of the hole in the glass, is slit longitudinally and placed within the hole to form a cushioning gasket 2. This form of gasket is easily procurable and is preferred because of economy. Special gaskets can be molded of compounds particularly adapted to the purpose, if desired.

The ball socket is comprised of two similar plates 3 and 4, having concave margins 5 adapted to seal against the gaskets 2 when drawn together by the screw bolts 6. The socket is formed by the outwardly extending flanges 7—7 on the inner edges of the plates 3 and 4. These flanges are struck on a radius equal to the radius of the spherical pivot or ball to provide a bearing or bearing member for the pivot or ball. The socket is thus permanently fixed within the hole in the glass 1. The gasket 2 cushions the strain on the glass and hermetically seals the joint between the glass and the margins 5—5 of the plates.

The spherical pivot or ball is preferably composed of a pair of hemispheroidal shells 8 and 9, joined at their equators and assembled on the tube or conduit 10 passing diametrically through the ball and to which it is attached by soldering or otherwise. The ball fits snugly within the socket formed by the flanges 7—7 and is adapted to be frictionally held thereby in any adjusted position, by the regulation of the screw bolts 6. To control this tension to allow for any inequalities in the contour of the ball, I prefer to interpose the split washers 11 between the plate 4 and the nuts 12. These washers are commonly known in the trade as helical nutlocks and in the present instance perform the double functions of imparting resiliency to the socket tension and locking the nuts against unscrewing.

The reflector 13 may be of any conventional size or shape and is soldered or fixed to a protruding end of the tube 10 at 14, and this part of the device into which the electric lamp or light source 18 is inserted I may generally term a light source support or connection or merely a light for convenience. The interior of the reflector is polished and protected by the glass 15 in the usual manner.

The handle 16 is adjustably secured to the opposite end of the tube or conduit 10 by means of the set screw 17, threaded through the handle and the tube, and the portion of the tube 10 upon which the handle 16 is situated I may term a handle support or connection for convenience. The diameter of the handle is slightly less than the diameter of the hole through the socket flange 7 for convenience in assembling.

The signaling means or electric bulb 18 is mounted within the socket 19, connecting with positive and negative electrodes 19′ in the conventional manner. The electrodes 19′ extend through the tube 10 and are provided with means on the opposite ends for receiving and retaining the plug 20, secured on the end of the flexible cable 21 for supplying electric current through the electrodes to the bulb 18. The end of the socket 19 is provided at 22 with tortuous slots or "bayonet joints" engaging transverse pins in the plug 20, whereby the plug may be caused to act as a switch for interrupting the flow of the electric current through the electrodes by breaking contacts, without removing the plug from the socket.

The socket is slidable within the tube 10 to enable focusing the lamp 18 in the reflector, and may also be fixed by the set screw 17. The orbit of movement of the ball within the socket is controlled by an upward extension 23, provided on the plate 3, adapted to contact with the handle 16. The extension thus prevents tilting upward of the spotlight above the horizontal position, when pointed straight ahead, but allows free movement when swung laterally or to permit the handle descending into the spaces 24 and 25 on opposite sides of the gauge 23. It is obvious that by giving the proper contour to the gauge 23, that any irregular orbit of movement can be obtained. I prefer to make this gauge 23 a separate attachment to be secured to the plate 3 by the lowermost bolt 6, so that a gauge may be supplied that will properly limit the movement of the spotlight in accordance with local laws governing the same. In localities having no restrictions, the gauge can be omitted.

While this invention has been disclosed in connection with the mounting and manipulation or spotlights, I do not wish to be understood as limiting it to that particular use or the specific construction as shown but adapted for that purpose; as it may be adapted to other uses, by those skilled in the art, without departing from the purview of this invention.

Having thus described this invention, what I claim and desire to secure by Letters Patent is:

1. In combination with a windshield having an opening, socket plates engaging opposite faces of the windshield adjacent said opening, a spherical pivot in said socket, a spotlight attached to said pivot on one side and a handle connected with said pivot on the opposite side of said windshield, and means exterior of said pivot for resiliently urging said socket plates into frictional engagement with said pivot.

2. A windshield spotlight, including, a spherical pivot, means providing a bearing embracing said pivot and means for engaging the marginal edges of a windshield about an opening therethrough, a handle support on one side of said pivot, a light support on the opposite side of said pivot, and means connected to the first said means and projecting about a part of said pivot into a part of the path of movement of one of said supports for limiting movement of the light source above a horizontal plane over a predetermined distance of movement thereof.

3. In combination with a windshield having an opening, bearing members, means embracing opposite marginal edges of said opening for securing said bearing members in line and substantially concentric with said opening, a pivot member within and embraced by said bearing members, a source of light on one side of said pivot member, a handle on the other side of said pivot member, and a light range limiting member secured to one of said bearing members and projecting over a portion of said pivot member in all positions of the latter for limiting directional movements of the source of light above a predetermined point in a vertical plane in space passing through the center of said pivot member and perpendicular to the windshield.

4. A device such as described, comprising a socket; a spherical pivot movably retained in said socket; a hollow conduit passing diametrically through said pivot and projecting therefrom; electrodes arranged within said hollow member and having sockets at opposite ends thereof; a source of electrical energy adapted to be secured to one of said sockets; and an illuminating means adapted to be secured to said other socket.

5. In combination with a plate having an opening therein; of a pair of separable socket plates engaging the opposite sides of said opening; a spherical pivot movably retained in said socket plates; means for regulating the position of said socket plates relative to said pivot; a hollow conduit diametrically passing through said pivot and projecting therefrom; electrodes arranged within said hollow member and having sockets at opposite ends thereof; a sorce of electrical energy adapted to be secured to one of said sockets; and an illuminating means adapted to be secured to said other socket.

In testimony whereof, I have hereunto set my hand at San Francisco, Calif., this 24th day of May, 1922.

BALDWIN VALE.